April 25, 1950        F. J. LEE        2,505,413
ADJUSTABLE VALVE SEAL OR THE LIKE
Filed June 1, 1945
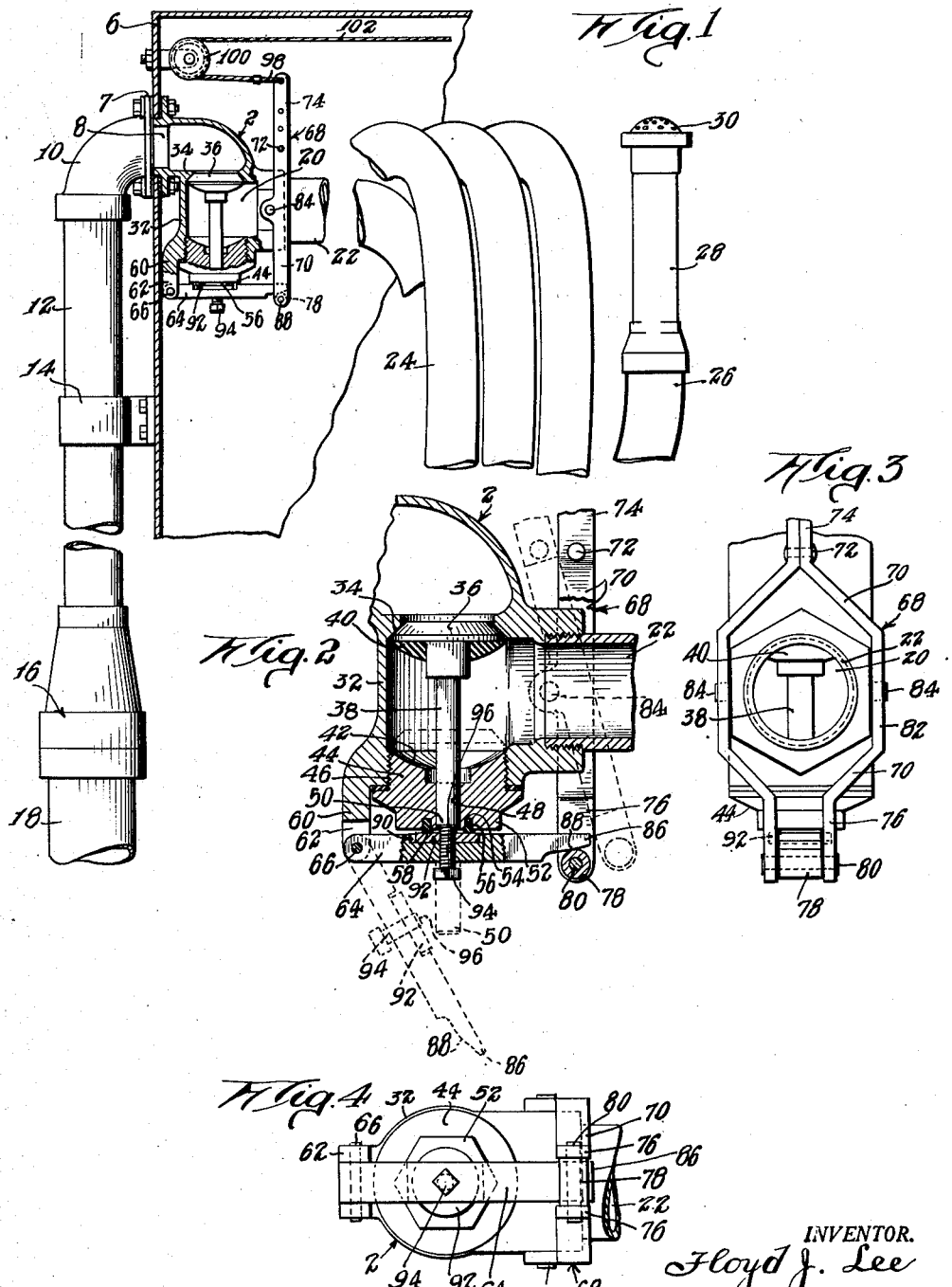
INVENTOR.
Floyd J. Lee
BY
Lyon & Lyon
ATTORNEYS Patented Apr. 25, 1950

2,505,413

UNITED STATES PATENT OFFICE 2,505,413

ADJUSTABLE VALVE SEAL OR THE LIKE

Floyd J. Lee, Pasadena, Calif.

Application June 1, 1945, Serial No. 597,142

5 Claims. (Cl. 251—26)

My invention relates to adjustable valve seals and more particularly to sealing means and devices, which are adapted for preventing the fluid, stored or left in a discharge pipe or a hose, from leaking and in addition for providing means with which to insure an instantaneous and a constant fluid flow through and from said discharge hose, and for maintaining said fluid flow at a pressure, when said valve is opened.

In valves, particularly of the type used in fire fighting apparatus, and where a water hose is maintained connected for an instant use, the flow of water is delayed and retarded because said hose is empty, also, the accumulation of dust or sediment in said hose prevents the water from flowing freely, and in addition, said hose, particularly of the type made out of rubber or similar composition, becomes deteriorated, which is due to the atmospheric action, causing it to dry when left empty for any length of time and causing it to crack, which eventually causes leaks.

Accordingly an object of my invention is to provide a valve seal which is of such construction which will permit the water to remain in said hose at all times and at the same time to permit its use, instantaneously, in case of an emergency, allowing it to pass, at full pressure, through said hose and its nozzle, when the valve is opened.

Another object of my invention is to provide a suitable valve seal, which is positioned at the valve control stem member, so that the fluid, when stored or remaining at the discharge end of said valve, will be prevented from leaking around said valve stem.

A further object of my invention is to provide a suitable valve stem sealing means in a valve, which is of such construction whereby the fluid, when stored or left and kept in the discharge pipe or a hose, is prevented from leaking, and also for allowing said valve stem to be released instantaneously, when the valve is opened, and thereby providing an instantaneous fluid flow through said discharge pipe or hose, in case of an emergency.

Another object of my invention is to provide a sealed valve, said valve having a fluid inlet pipe provided with a revolvable pipe joint means for allowing said valve to be turned around in any direction, also, said valve having a fluid discharge pipe equipped with a suitable nozzle, the position of which is normally at the level with said valve and thereby permitting the fluid to be stored therein and in said hose, which prevents said hose from becoming dried, cracked and eventually deteriorated, and also for providing an instantaneous fluid flow through said nozzle of said hose and at full pressure, when said valve is opened.

A further object of my invention is to provide said valve with a suitable valve control means, which is adapted for opening said valve instantaneously, and thereby permitting the fluid, under pressure, to pass therethrough and at no loss of time whatsoever, in case of an emergency.

Other and further objects and advantages of my invention as will hereinafter more fully appear, I attain by the construction herein shown on the drawings and described in the specification, forming a part of my application.

Reference now being had to the accompanying drawings, in which the similar reference characters denote the same parts.

In the drawings;

Fig. 1 shows the fragmentary sectional and partly elevational view of the valve and its inlet connection, also showing a partial view of the discharge hose and its nozzle, including the valve controlling and sealing means.

Fig. 2 shows a vertical sectional view of a valve partly fragmentary, also showing the valve control and the valve sealing means associated therewith.

Fig. 3 shows the end elevational view of the valve, taken from the right of the Fig. 2.

Fig. 4 shows the bottom view of the valve, showing the position of the stem sealing means.

Describing my invention more in detail, in its broader aspects, said invention comprises a valve, generally designated by numeral 2, which is mounted upon a wall 4 of a suitable cabinet 6, and which is held thereon by means of mounting flange 7.

The valve 2 is provided with an intake port 8 which connects with a suitable intake connection 10, to which an intake pipe 12 is connected, and which is supported in its position by means of a bracket 14.

Said intake pipe 12 is also provided with a suitable swing joint member 16 which connects with an inflow pipe 18, so that said valve 2 including said cabinet 6 may be swung around in any desired direction, when required.

Said valve 2 is also provided with an outlet 20 which connects with a discharge nipple 22, to which a suitable flexible hose 24 is connected, the length of which may be provided for covering any desired distance as in practice may be most desirable, having its end 26 terminating with a nozzle member 28 which is provided with a stream or spray connection 30, as shown.

The valve 2 comprises a housing 32, having an inflow seat 34 which is adapted for receiving therein a suitable valve sealing disc member 36.

The disc member 36 is provided with a stem member 38 which extends downwardly and is also provided with a resilient packing ring 40, and which is adapted for sealing the recess 42 of the valve plug member 44, when the valve is opened, as shown in dotted lines, in Fig. 2.

Said valve plug member 44 is held in place and is mounted in said housing 32 by means of the threaded section 46, and, at its center section a suitable hole or passage 48 is provided adapted for receiving and for guiding therethrough the end section 50 of said stem member 38, while the outer surface section 52 of said plug member 44 is provided with a circular groove 54 adapted for mounting therein a suitable sealing ring 56, and which, in its preferred position, is disposed in close proximity to said passage 48, and is also so arranged, whereby its surface or edge 58 is allowed to extend partially and over said surface section 52, the purpose of which will be presently described.

Said housing 32 is also provided with a bracket 60 which extends downwardly and terminates with a yoke 62 having a suitable locking bar member 64 pivotally mounted therein upon a pivot pin 66, as shown.

At the opposite side of said housing 32 a suitable valve control member 68 is mounted, which comprises a pair of side bars 70, lying parallel to each other and held together by means of rivets 72 or the like, disposed at the upper end 74 thereof, while their lower end 76 is provided with a roller 78 held in place by means of a roller pin 80, which is pinned thereover at the ends, thus providing a very rigid construction, as shown in Fig. 3.

When assembled, said control member 68 is so arranged, whereby its side bars 70 and at the central section 82 thereof, straddle the valve outlet 20, whereon said side bars 70 are held in a pivotal position by means of pivot pins 84, thus providing a pivotal movement for said control member 68, as shown in dotted lines, in Fig. 2.

Said locking bar member 64 extends frontwardly, the end of which, as at 86, is provided with a cam 88 adapted for engaging said roller 78 when said control member 68 is in its normal vertical position, also, said bar member 64, at its center section is provided with a suitable recess 90 which is adapted for housing therein a ring plate 92 and which is held in position by means of a suitable set screw member 94, having its end 96 adapted for engaging the end section 50 of said stem member 38.

The upper end 54 of said control member 68 is provided with an extension 95, having a hole 96 adapted for receiving therein a looped cable 98, the end of which is threaded through a pulley 100 mounted upon said wall 4 and having its extended end 102 extending frontwardly, so that said valve 2 may be operated manually or automatically, by some other suitable means.

When said valve 2 is in operation, said valve disc 36 rests within said seat 34, the position of which is supported by means of said set screw 94, the end of which bears against the stem end 50, so that a positive seal may be had against the fluid pressure passing into and through said intake pipe 12.

And, when said valve control member 68 is tilted, as shown in Fig. 3, and the roller 78 releases the cam 88 from its locked position on said locking bar 64, then said disc 36 is forced downwardly and drops to the bottom allowing the packing ring 40 to rest upon the recess 42 and causing said ring to seal the passage 48 around said stem 38 and permitting the fluid, under pressure, to pass into the outlet 20 of said valve, then through said hose 24 and finally into and through the nozzle 28.

In order to re-set the seal disc member 36 of said valve, the stem 38 is pushed upwardly, then the locking bar 64 is raised into its normally horizontal position, allowing the end of said set screw 94 to bear against the stem end 50, whereupon the roller 78 of said valve control member 68 in bearing upon said cam 88, causes said disc 36 to seal the flow.

In the event said disc 36 is not properly seated, when said locking bar 64 is placed and held in position, then the set screw 94 may be employed by screwing it upwardly and against said stem end 50, and thereby preventing leakage through said valve.

Also, to prevent the fluid leakage from said valve, and from the outlet passage 20 thereof and around said stem 38 including said hole 48, when said disc 36 is in its seated position, then the knurled ring plate 92 is employed, which may be screwed tight against the edge 58 of said sealing ring 56, and thereby sealing said valve entirely.

In sealing said valve 2, in the manner herein described, will in no way whatsoever, impair the instantaneous operation thereof, and the sensitivity of the operation of said valve can always be dependable upon the particular positions of the roller 78 in relation to the cam 88 of said locking bar member 64.

Therefore, a quantity of water or fluid may be left in said hose 24, so that it may remain full at all times, having the nozzle 28 mounted in a position, so that the nozzle connection 30 may be maintained slightly above said valve 2, in order to prevent fluid leakage therefrom, and in this manner providing means for preventing said hose from becoming cracked, or subjected to the action of the atmosphere, and deteriorating.

Then in case of an emergency, when said nozzle 28 is pulled from its mounted position, and said hose 24 is extended its full length, the fluid or water, so maintained in said hose is brought to the fire or a place of conflagration, within a fraction of a time, and said valve may then be opened, by pulling on said extended end of said cable 102, which releases said locking bar member 64 and permitting said sealing disc member 36 to release the fluid, flowing at a pressure provided at the source of supply.

Also, it may be noted, that an automatic feature may be used and employed in opening said valve 2 and operating simultaneously when said nozzle 28 is removed from its mounted position, thus causing the fluid, under pressure to be released instantaneously, while and during the time said hose 24 is being extended and brought forward, which adds considerably to the efficiency of the fire fighting apparatus, and eliminating the delay, otherwise unavoidable.

While I have thus described my invention with great particularity, it will be clear that the same may be modified throughout a wide range.

I accordingly do not propose to be limited to the exact details of construction herein shown on the drawings and described in the specification, but reserve the rights, in practice, to make the necessary changes and modifications therein, which may come within the scope of the appended claims.

I claim as my invention:

1. A valve, comprising a housing having a passage connecting an inlet opening and outlet opening and having a valve seat between the inlet and outlet openings, a sealing disc means in said housing for contacting said seat and sealing the passage between said inlet and outlet openings of said housing, a stem means extending out of said disc means, a plug member means in said housing for holding the end of said stem means in position, a sealing ring means at the outer section of said plug member and in close proximity to and around the end of said stem means, a locking bar means hingedly connected to said housing for engaging the end of said stem means and for holding said sealing disc means in its sealing position, a tiltable control means mounted on said housing and engaging said last mentioned means for controlling the position of said disc means and for instantaneously releasing same from its position when tilted, and ring plate means in said locking bar means for engaging said sealing ring means and for sealing the fluid leakage around the end of said stem means, when said disc means is in its sealed position.

2. In a valve of the class described as disclosed in claim 1 wherein a cam means is provided at the end of said locking bar means, and a roller means mounted in said tiltable control means for engaging said cam means, whereby an instantaneous release of said locking bar may be secured when said control means is tilted.

3. In a valve of the class described as disclosed in claim 1 wherein an adjusting set screw is provided in said locking bar means for engaging the stem of said sealing disc means and for holding same in its sealed position.

4. A valve of the class described in claim 1, wherein an adjustable set screw is provided in said locking bar means for engaging the stem of said disc sealing means and for holding the same in its sealed position, and wherein set ring plate means is threaded to said set screw.

5. A valve comprising a housing having a passage connecting an inlet opening and an outlet opening and having a valve seat between said inlet opening and outlet opening, a sealing disk means in said housing for engaging said valve seat and sealing the passage between said inlet opening and outlet opening of said housing, a stem means extending from said disk means through said housing, a sealing ring means at the exterior of said housing positioned in close proximity to and around the end of said stem means, a locking bar means hinged to said housing for engaging the end of said stem means and for holding said sealing disk means in a sealing position, a tiltable control means mounted on said housing and engaging the last-mentioned means for rapid release thereof, and a ring plate means in said locking bar means for engaging said sealing ring and for sealing the fluid leakage around the end of said stem means, when said stem means is in its sealed position.

FLOYD J. LEE.

REFERENCES CITED

The following references are of record in the file of this patent:

UNITED STATES PATENTS

| Number | Name | Date |
|---|---|---|
| 650,179 | Knox | May 22, 1900 |
| 1,606,191 | Siebenmann | Nov. 9, 1926 |
| 1,996,489 | Phillips | Apr. 2, 1935 |